United States Patent [19]

Gamliel

[11] Patent Number: 4,781,148
[45] Date of Patent: Nov. 1, 1988

[54] LIFTING FEEDING TROUGHS FOR POULTRY COOPS

[75] Inventor: Joseph Gamliel, Ramat Yishai, Israel

[73] Assignee: G.I.R. Automatic Mechanization Co. Ltd., Ramat Yishai, Israel

[21] Appl. No.: 933,920

[22] Filed: Nov. 24, 1986

[51] Int. Cl.⁴ ............................................... A01K 1/02
[52] U.S. Cl. ................................... 119/19; 119/51 R; 119/52 R
[58] Field of Search .................. 119/22, 18, 51 R, 19, 119/52 AF, 51 FS, 52 R; 254/317, 321, 365

[56] References Cited

U.S. PATENT DOCUMENTS

| | | | |
|---|---|---|---|
| 398,502 | 2/1889 | Dyblie et al. | 254/365 |
| 1,204,408 | 11/1916 | Choate | 254/365 |
| 2,275,009 | 3/1942 | Danker | 119/22 |
| 2,516,798 | 7/1950 | Peterson | 119/22 |
| 2,857,028 | 10/1958 | Brooks | 254/365 |
| 2,922,624 | 1/1960 | Addicks | 254/365 |
| 3,063,679 | 11/1962 | Nusbaum | 254/321 |
| 3,124,104 | 3/1964 | Carpenter | 119/52 AF |
| 3,234,913 | 2/1966 | Haen et al. | 119/52 AF |
| 3,901,194 | 8/1975 | Meyer et al. | 119/52 AF |
| 4,153,010 | 5/1979 | Erfeling | 119/52 AF |
| 4,271,941 | 6/1981 | Miller | 192/46 |

*Primary Examiner*—Gene Mancene
*Assistant Examiner*—Michael Lynch
*Attorney, Agent, or Firm*—Benjamin J. Barish

[57] ABSTRACT

A poultry coop comprises a plurality of feeding troughs, a winding drum and cable for each trough, a common drive for all the winding drums, and a clutch for each of the winding drums including a manually movable operator for selectively coupling and decoupling its respective winding drum to the drive in order to lift or lower its respective feeding trough.

4 Claims, 3 Drawing Sheets

LIFTING FEEDING TROUGHS FOR POULTRY COOPS

BACKGROUND OF THE INVENTION

The present invention relates to lifting apparatus for raising and lowering various types of loads. The invention is particularly useful in poultry coops or like applications for raising and lowering the feeding troughs in order to permit cleaning of the area under them.

SUMMARY OF THE INVENTION

According to the present invention, there is provided a poultry coop comprising a plurality of feeding troughs; a plurality of winding drums, one for each of the feeding troughs; a plurality of cables each attached at one end to one of the winding drums, and at the opposite end to two-spaced points of its respective trough for lifting and lowering its respective trough; a common drive for all the winding drums; and a clutch for each of the winding drums, each of the clutches including a manually movable operator for selectively coupling or decoupling its respective winding drum to the drive in order to selectively lift or lower its respective trough.

More particularly, the common drive includes a motor and a drive shaft. Each of the clutches comprises a first clutch member fixed to its respective winding drum, and a second clutch member movable axially towards and away from the first clutch member. The common drive shaft passes freely through all the winding drums and clutch members but is keyed to the second clutch members so as to be rotated therewith. The clutch operator for each of the winding drums is manually movable to selectively engage or disengage its respective second clutch member with the respective first clutch member of the winding drum to selectively raise or lower its respective feeding trough.

Further, each of the winding drums includes a ratchet wheel fixed thereto, and a locking pawl cooperable with the respective ratchet wheel such that in the locking position of the pawl it locks the respective winding drum against rotation in the trough-lowering direction but permits rotation in the trough-raising direction, whereas in the releasing position of the pawl it permits its winding drum to be rotated in either the trough-raising or trough-lowering direction.

In addition, the first and second clutch members for each of the winding drums have teeth on their confronting faces which engage or disengage to effect the coupling or decoupling, respectively. The teeth are formed with shaped surfaces such that rotation of the second clutch member by the common drive shaft in the trough-lowering direction while its locking pawl is in its locking position will cause the second clutch member to move axially to decouple its winding drum from the common drive shaft.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
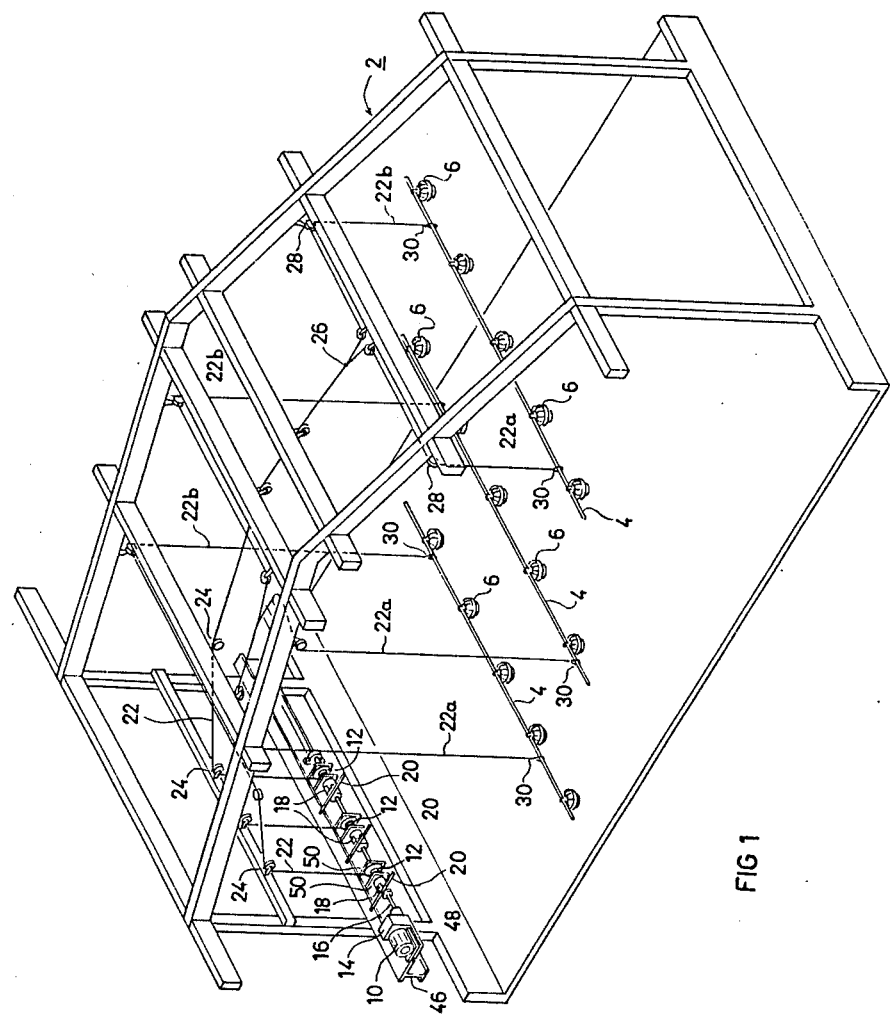
FIG. 1 is a three-dimensional view illustrating one form of apparatus constructed in accordance with the present invention.

The lifting apparatus illustrated in the drawings is for installation in a poultry coop to provide an arrangement for conveniently raising and lowering the feeding troughs of the poultry coop in order to permit cleaning of the area under the feeding troughs.

The apparatus illustrated in FIG. 1 thus includes a poultry coop structure, generally designated 2, having a plurality of feeding troughs 4 extending longitudinally of the structure, with each feeding trough provided with a plurality of buckets or containers 6 spaced along the length of each trough for receiving the food to be fed to the poultry. As one example, such a chicken coop may have in the order of 8 or more feeding troughs, and may also include a plurality of watering troughs (not shown), for example four or more, also extending longitudinally at the poultry coop and provided with poultry drinkers at spaced intervals from which the poultry drink.

The lifting apparatus for raising and lowering the troughs is installed at one end of the poultry coop 2. Briefly, such lifting apparatus comprises a motor 10 selectively driving a plurality of winding drums 12, there being one winding drum for each of the troughs 4 to be raised or lowered. The transmission from motor 10 to the winding drums 12 comprises a gear box 14, a drive shaft 16, and a clutch 18 selectively coupling, by means of a manually movable clutch operator 20, each of the winding drums 12 to the drive shaft 16. Each of the winding drums 12 has fixed thereto a cable 22 which passes over a plurality of pulleys 24 supported by the roof of the poultry coop 2. Each of the cables 22 is joined at its opposite end, as shown at 26 in FIG. 1, to a pair of further cables 22a, 22b which pass over further pulleys 28 supported by the roof of the poultry coop and terminate in loops or other coupling arrangement engageable with the opposite ends of the respective feeding trough 4.

It will thus be seen that when any one of the plurality of winding drums 12 is rotated by motor 10 in one direction, its cable 22 is wound on the drum to raise its respective trough 4; and when the winding drum is rotated in the opposite direction, the cable unwinds from the drum to lower its respective trough.

The remainder of the description will be directed primarily to the arrangement for selectively rotating the winding drums 12 in one or the other direction for raising or lowering their respective troughs 4.

Figure 2:
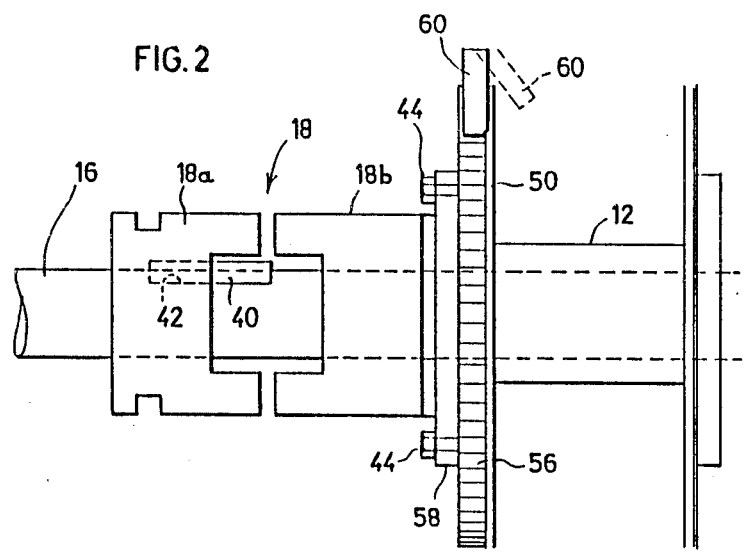
FIG. 2 is an enlarged side elevational view illustrating the transmission including the clutch for each of the winding drums in the apparatus of FIG. 1.

FIG. 2 illustrates the coupling of one of the winding drums 12 via a clutch 18 to the drive shaft 16, wherein it will be seen that the clutch includes two clutch members, 18a, 18b. Clutch member 18a is keyed to the drive shaft 16 by a rib 40 formed in the drive shaft receivable within a recess 42 (see also FIG. 3) formed in clutch member 18a; whereas clutch member 18b is fixed to drum 12 by means of bolts 44. Drum 12 is of sufficiently large diameter to permit the drive shaft 16 to freely pass therethrough. Clutch member 18b is thus fixed to rotate with its winding drum 12, whereas clutch member 18a is keyed to the drive shaft 16 so as to rotate therewith, but is axially movable with respect to the drive shaft towards and away from clutch member 18b.

Figure 3:
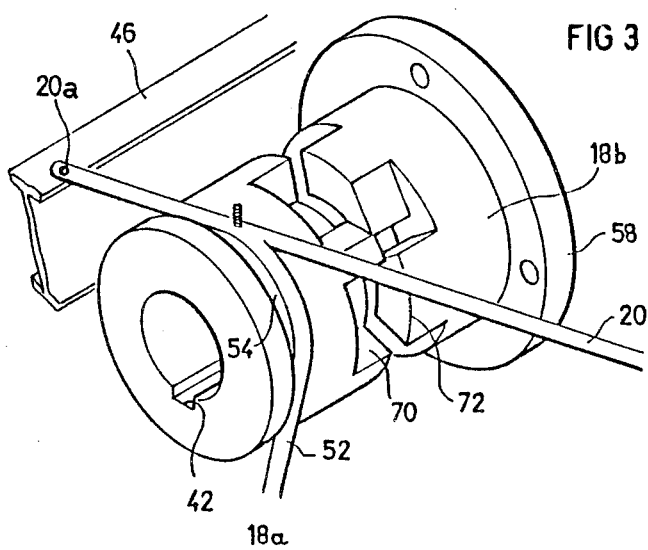
FIG. 3 is a three-dimensional view illustrating each of the clutches.

As shown particularly in FIG. 3, clutch operator 20 is in the form of an handle pivotably mounted at one end 20a to an I-beam 46. As shown in FIG. 1, I-beam 46 mounts the lifting apparatus including drive motor 10 mounted to the beam by a base 48, and the winding drums 12 each mounted to the beam by plates 50. Handle 20 carries a fork 52 received within an annular recess 54 formed in the movable clutch member 18a for shifting the clutch member either in one direction into engagement with clutch member 18b in order to effect a coupling between drive shaft 16 and its respective winding drum 12, or in the opposite direction away from clutch member 18b in order to decouple the winding drum from the drive shaft.

Each winding drum 12 further comprises a ratchet wheel 56 secured by bolts 44 to the winding drum and to end flange 58 of its respective clutch member 18b. Ratchet wheel 56 cooperates with a pawl 60. The pawl and ratchet arrangement may be of a conventional construction, such as used for example in lifting jacks, wherein the pawl is movable either to a locking position or an unlocking position with respect to the ratchet. FIG. 2 illustrates pawl 60 in its locking position with respect to ratchet 56, wherein the pawl permits winding drum 12 to be driven in the load-raising direction, but is received within a tooth of the ratchet wheel to lock the drum against rotation in the load-lowering direction. Pawl 60, however, is manually movable to an unlocking position, shown in broken lines in FIG. 2, wherein it releases its winding drum 12 for rotation in both the load-raising or load-lowering directions.

Figure 4:
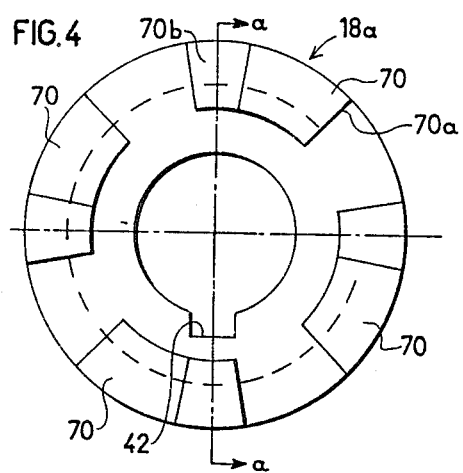
FIG. 4 is an end-elevational view of one of the clutch members in the clutch of FIG. 3, FIG. 4a being a sectional view along lines a—a of FIG. 4.
Figure 4A:
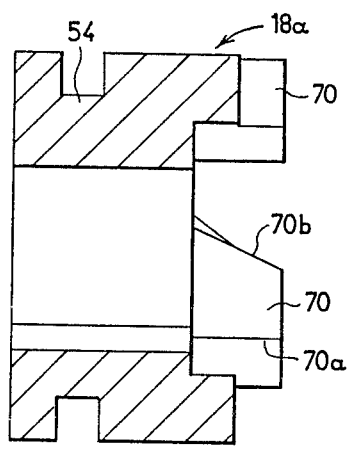
Figure 5A:
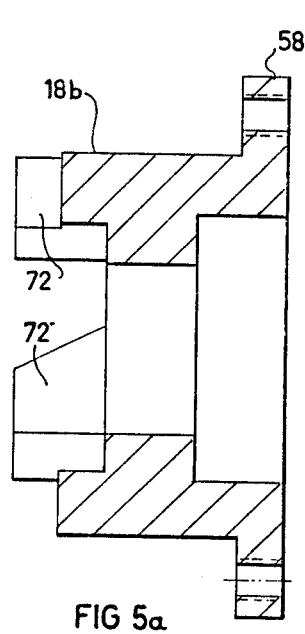
FIG. 5 is an end-elevational view of the other clutch member in the clutch of FIG. 3, FIG. 5a being a sectional view along lines a—a of FIG. 5.
Figure 5:
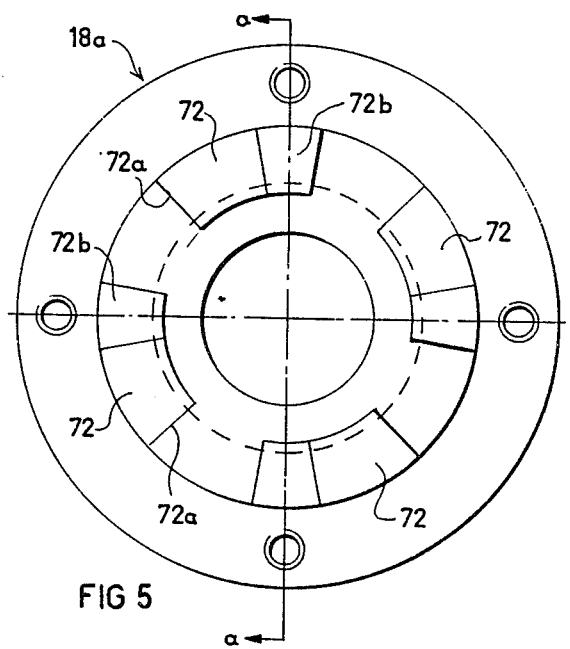

FIGS. 4 and 4a more particularly illustrate the construction of the movable clutch member 18a, and FIGS. 5, 5a more particularly illustrate the construction of the other clutch member 18b fixed to its respective winding drum 12.

Thus, as shown in FIGS. 4, 4a, clutch member 18a is formed with axial recess 42 receiving rib 40 of the drive shaft 16 to rotate with the drive shaft while permitting axial movement with respect thereto, and also the annular recess 54 receiving fork 52 of handle 20 which is used to manually shift clutch member 18a towards or away from clutch member 18b. In addition, the face of clutch member 18a facing clutch member 18b is formed with a plurality of teeth 70 (four such teeth being shown in FIG. 4) each of which teeth has a flat face 70a on one side and a tapered face 70b on the opposite side.

Clutch member 18b shown in FIGS. 5, 5a includes the previously mentioned annular flange 58 formed with a plurality of openings for receiving bolts 44 fastening same with ratchet wheel 56 to its winding drum 12. The face of clutch member 18b facing clutch member 18a is also formed with a plurality (4) teeth 72 having a flat face 72a on one side and a tapered face 72b on the opposite side. Teeth 72 are circumferentially spaced from each other so as to permit teeth 70 of clutch member 18a to be received therebetween, with the tapered faces 70b of teeth 70 engageable with tapered faces 72b of teeth 72.

The apparatus illustrated in the drawings operates as follows:

As indicated earlier, a winding drum 12 is provided for each of the feeding troughs 4. The ends of cable 22a, 22b from each winding drum 12 may be permanently attached by loops 30 to the opposite ends of the respective trough, or may be attached only whenever the trough is to be raised and lowered.

Whenever all the feeding troughs 4, or only selected ones, are to be raised, drive motor 10 is operated to rotate the winding drums 12 in the load-raising direction. Handle 20 for each trough to be raised is first manually moved to bring the clutch member 18a for the respective winding drum into engagement with its clutch member 18b, thereby coupling the winding drum to drive shaft 16 via drive shaft rib 40 coupled to clutch member 18a, and teeth 70, 72 coupling the two clutch members for rotation together. When drive 10 is operated to rotate the winding drums 12 in the load-raising direction, the coupling of the two clutch members 18a, 18b is effected via the flat faces 70a, 70b of their teeth 70; also pawls 60 would all be in their locking positions, illustrated in full lines in FIG. 2, so as to permit their respective winding drums to be rotated in the load-raising direction, but to lock them against rotation in the load-lowering direction. Accordingly, whenever motor 10 is deactuated, the locking members 60 will lock their respective troughs 4 in the raised positions.

Whenever it is desired to lower the troughs 4, or selected ones of them, locking pawls 60 for the troughs to be lowered are moved to their releasing positions with respect to their ratchet wheels 56. If, however, one or more of the feeding troughs 4 is not to be lowered, its locking pawl 60 is retained in its locking position with respect to its ratchet wheel 56, and handle 20 of its respective clutch 18 is moved to shift clutch member 18a from clutch member 18b, thereby decoupling the winding drum from drive shaft 16. Accordingly, that particular feeding trough will be retained and locked in its elevated position.

However, should it occur that the operator neglects to move handle 20 to the decoupling position with respect to a feeding trough to be retained and locked in its elevated position, the tapered faces 70b, 72b of teeth 70, 72 on clutch members 18a, 18b are effective to automatically shift clutch member 18a leftwardly away from clutch member 18b, thereby decoupling clutch 18 for that winding drum 12, and preventing damage to the mechanism.

While the invention has been described with respect to one preferred embodiment, it will be appreciated that many other variations, modifications and applications of the invention may be made.

What is claimed is:

1. A poultry coop comprising:
a plurality of feeding troughs;
a plurality of winding drums, one for each of said feeding troughs;
a plurality of cables each attached at one end to one of said winding drums, and at the opposite end to two-spaced points of its respective trough for lifting and lowering its respective trough;
a common drive including a motor and drive shaft for all said winding drums;
and a clutch for each of said winding drums, each clutch including a manually movable operator, a first clutch member fixed to its respective winding drum, and a second clutch member movable axially towards and away from said first clutch member;

said common drive shaft passing freely through all said winding drums and clutch members but being keyed to said second clutch members so as to rotate therewith;

said clutch operator for each of said winding drums being manually movable to selectively engage or disengage its respective second clutch member with the respective first clutch member of the winding drum to selectively raise or lower its respective feeding trough.

2. The poultry coop according to claim 1, wherein each of said winding drums includes a ratchet wheel fixed thereto, and a locking pawl cooperable with the respective ratchet wheel such that in the locking position of the pawl it locks the respective winding drum against rotation in the trough-lowering direction but permits rotation in the trough-raising direction, whereas in the releasing position of the pawl it permits its winding drum to be rotated in either the trough-raising or trough-lowering direction.

3. The poultry coop according to claim 2, wherein said first and second clutch members for each of said winding drums have teeth on their confronting faces which engage or disengage to effect said coupling or decoupling, respectively; said teeth being formed with shaped surfaces such that rotation of said second clutch members by the common drive shaft in the trough-lowering direction while its respective locking pawl is in its locking position will cause the second clutch member to move axially to decouple the respective winding drum from the common drive shaft.

4. The poultry coop according to claim 1, wherein said clutch operator for each of said winding drums comprises a handle pivotably mounted at one end to a common supporting member for supporting the common drive and is coupled to said second clutch member to move axially when the handle is manually moved, said handle being coupled to said second clutch member by a fork member fixed to the handle and received within an annular recess formed in the second clutch member.

* * * * *